Figure 1:
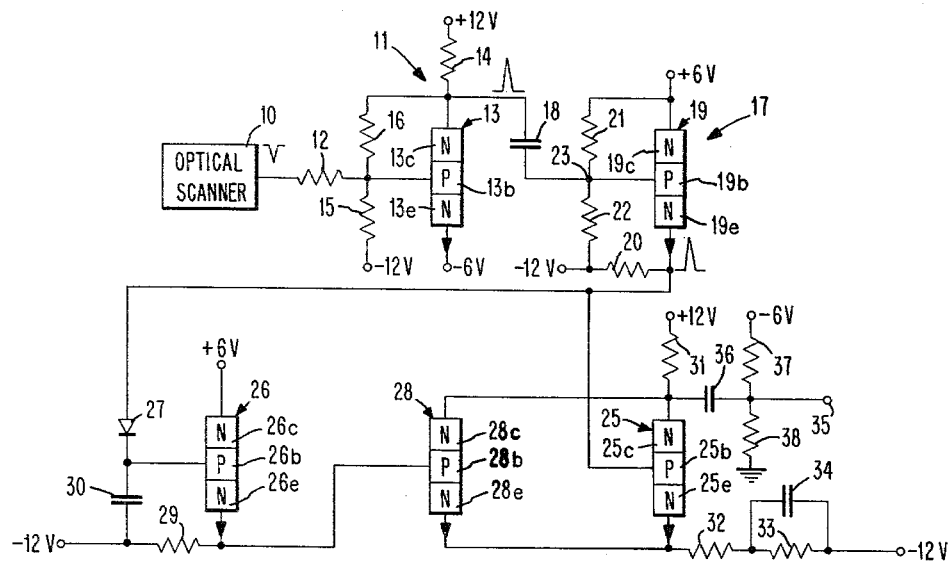

March 16, 1965   B. E. ALDRIDGE ET AL   3,174,061
AMPLITUDE DISCRIMINATOR
Filed May 28, 1962

INVENTORS
BRUCE E. ALDRIDGE
JOHN B. NEWMAN JR.
BY John C. Black
ATTORNEY 3,174,061
AMPLITUDE DISCRIMINATOR
Bruce E. Aldridge, Sarasota, Fla., and John B. Newman, Jr., Vestal, N.Y., assignors to International Business Machines Corporation, New York, N.Y., a corporation of New York
Filed May 28, 1962, Ser. No. 197,960
4 Claims. (Cl. 307—88.5)

The present invention relates generally to improvements in amplitude discriminators and more particularly but not exclusively to improvements in amplitude discriminators which are particularly adapted to produce an output pulse in response to each significantly higher amplitude increment of a continuous signal which is characterized by variable amplitude increments of significantly lower amplitude interposed between periodic variable amplitude increments of significantly higher amplitude.

The output of the improved amplitude discriminator is particularly adapted to drive logic circuits in a character recognition system for synchronizing the analysis of the data which is produced in response to scanning an unknown character or pattern; however, it will be understood that the invention is limited only to the extent set forth in the appended claims.

In character recognition apparatus utilizing an optical scanner to produce timing pulses as well as data signals corresponding to characters which are scanned, a photomultiplier will produce a continuous signal which is characterized by recurring data bit timing pulses of relatively low amplitude and a periodic line scan timing pulse of somewhat higher amplitude, which timing pulses are mechanically synchronized with the data pulses.

For example, a character may be scanned line by line, and it is frequently desirable to arbitrarily divide each line into a desired number of distinct data bits. The bits are acted upon and stored in a desired position of a matrix register for subsequent identification with one of a number of predetermined characters. During the scanning of one line of a character, synchronized timing pulses each corresponding to a respective bit of a line scan is produced; and one of these timing pulses corresponds to the completion of the scan of a line.

In the interest of economy, it is desirable to use the same photomultiplier for producing the timing pulses corresponding to bits as well as the timing pulse corresponding to the complete line scan. By way of example, each scanned line may be divided into 68 data bits; and 68 timing pulses are therefore produced during each line scan time of 210 microseconds. One of the pulses is substantially larger in amplitude than the other 67, and this pulse is utilized as a synchronizing or gating signal for the circuits which transfer scanned data to storage.

The improved amplitude discriminator of the present invention is utilized for selectively detecting the larger signal and producing a pulse at its output in response to each of the large pulses.

Each line scan requires, for example, 210 microseconds and during this period, one of the larger pulses and 67 of the smaller pulses are produced by the scanning apparatus. In the usual optical scanner equipment making use of a source of light, a raster and a photosensitive device, the signal level on a cold start of the equipment is generally much lower than the signal level after the equipment is heated up. This heating is primarily due to the current passing through resistors in the circuitry and to friction in the mechanical scanner. The time required for heating to produce the higher level signals is generally 15 to 30 minutes, and the signal level is not necessarily constant after this heat up period. Also, aging of the photosensitive device will cause a progressively lower signal amplitude. It is required therefore that the amplitude discriminator of the present invention be arranged such that it will distinguish between the relatively lower signals and the higher signal even though the absolute levels of these signals will vary over a long period of time due to aging of the light source and the photosensitive device and will also vary over a relatively short period of time due to differences in ambient temperature in which the photosensitive device is operating.

It is therefore the primary object of the present invention to provide an improved amplitude discriminator which produces an output pulse in response to each higher amplitude input signal in a system in which the relatively higher and lower amplitude signals will vary in their absolute amplitude values.

It is another object of the present invention to provide an amplitude discriminator of the type described in the preceding paragraph which has a high degree of reliability and a high order of stability.

The foregoing and other objects, features and advantages of the invention will be apparent from the following more particular description of a preferred embodiment of the invention, as illustrated in the accompanying drawings.

Figure 2:
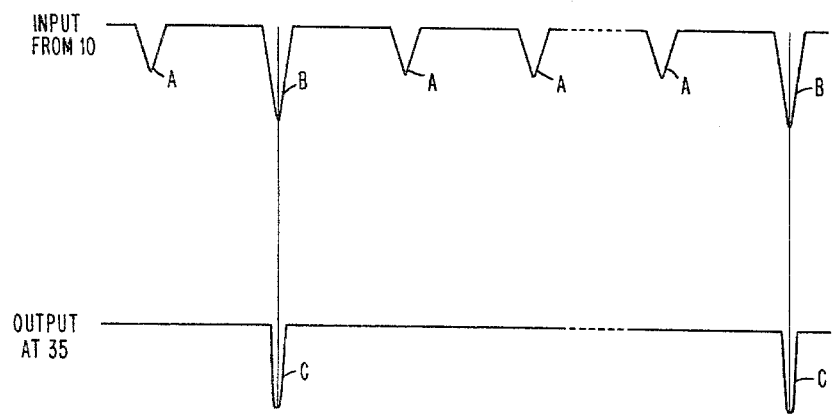

In the drawings:
FIG. 1 is a schematic diagram of a preferred form of the improved amplitude discriminator of the present invention; and
FIG. 2 illustrates typical input and output waveforms for the amplitude discriminator of the present invention.

FIG. 1 illustrates diagrammatically a conventional optical scanner 10 which may comprise a source of light (not shown), a photomultiplier (not shown) and a raster scanner (not shown) interposed between the source of light and the photomultiplier. The scanner is rotated at a desired speed in the usual manner and applies pulses of light from the source to the photomultiplier. The photomultplier responds to the pulses of light producing negative-going output pulses which are proportional in amplitude to the amount of light in each of the pulses. In the example selected, the negative pulses are divided into groups of 68, 67 of which are of lower amplitude and the 68th preferably being approximately double the amplitude of the smaller pulses.

The negative-going pulses from the photomultiplier are applied to a class A amplifier 11 by way of an isolating resistor 12. The precise construction of the amplifier 11 is shown by way of example and includes an NPN transistor 13 with its emitter electrode 13e connected directly to a source of negative potential and its collector electrode 13c connected to a source of positive potential by way of a load resistor 14. The resistor 12 is connected to the base electrode 13b of the transistor, and the base electrode is connected to a source of negative potential by way of a biasing resistor 15. A resistor 16 is connected between the base and collector electrodes.

The inverted output of the amplifier 11 is coupled to the input of a current driver 17 by way of a coupling capacitor 18. The current driver 17 is shown by way of example and preferably includes an NPN transistor 19 which is arranged in an emitter follower configuration. The collector 19c is connected directly to a source of positive potential, and the emitter 19e is connected to a source of negative potential by way of a load resistor 20. A voltage divider comprising resistors 21 and 22 is connected between the positive and negative supply potentials, and the junction 23 between the resistors is connected to the base 19b to provide a D.C. operating point for the base.

The output of the current driver 17 is applied directly to the base 25b of an NPN transistor 25 and to the base 26b of an NPN transistor 26 by way of an isolating diode 27. The transistors 25 and 26 together with a transistor 28 form the improved amplitude discriminator of the present invention. The transistor 26, which is arranged in an emitter follower configuration, has its collector 26c connected directly to a source of positive potential; and the emitter 26e is connected to a source of negative potential by way of a load resistor 29. A storage capacitor 30 is connected directly to the base 26b and to the source of negative potential.

The collectors 25c and 28c of transistors 25 and 28 are connected to a source of positive operating potential by way of a common load resistor 31. The emitters 25e and 28e are connected to a source of negative operating potential by way of resistors 32 and 33. A bypass capacitor 34 is connected across the resistor 33. The resistors 31 and 32 set the proper D.C. operating point for the transistor 25, and resistor 33 provides D.C. stability.

As indicated earlier, the base 25b is connected directly to the output of the emitter follower 17. The base 28b is connected to the emitter of transistor 26. The collectors 28c and 25c are connected to an output terminal 35 by way of a coupling capacitor 36. A voltage divider, comprising a resistor 37 connected to the output terminal 35 and to a source of positive potential and a resistor 38 connected between the output terminal and ground potential, forms a voltage level setting circuit for the output terminal 35.

The amplifier 11 is D.C. coupled to the photomultiplier circuit and preferably has a nominal gain of two. Because of the large variation in signal amplification, precision resistors are preferably used. In a typical arrangement, the D.C. level shift at the input to the amplifier may vary from −1.5 volts to −2.5 volts. The lower level signals A (FIG. 2) may typically vary from −.8 to −2.2 volts. The larger signal B (FIG. 2) which will hereinafter be referred to as the raster spike may in a typical embodiment vary from −1.6 volts to −4.4 volts. It can be seen therefore that the maximum variation in input signal level will be from −1.5 volts to a most negative signal amplitude of −6.9 volts. The maximum collector variation will therefore be 2(6.9−1.5) or 10.8 volts. For optimum reliability of the amplitude discriminator, the amplifier 11 should not be operated either in cutoff or in saturation. It is important that the small and raster spike signals each be amplified linearly. Preferred values of the various components will be given below, but it will be understood that these values are merely given by way of example and are not to be construed to limit the invention.

For optimum reliability of the amplitude discriminator of the present invention, the emitter follower 17 should not be operated at cutoff or saturation. Since the maximum possible amplitude swing at the collector 13c is in the preferred embodiment 10.8 volts, the base bias of the transistor 19 is preferably set at approximately −5.4 volts. This will assure normal conduction by the transistor 17 when no input signal is applied to the capacitor 18 with the emitter voltage being approximately equal to the base bias voltage. A maximum voltage swing at the collector 13c will shift the level of the bias at the base 19b to about +5.4 volts which assures operation of the transistor 19 below saturation. Thus, each positive input signal to the transistor 19 will be reproduced substantially linearly at the emitter output.

In operation, the negative pulses from the scanner 10 are amplified and inverted by the amplifier 11 and applied to the current driver 17.

The positive pulses from the output of driver 17 are then applied to the base 25b and to the capacitor 30 by way of diode 27. The polarity of the diode is such that it will pass the positive pulses to charge the capacitor 30 but will be reverse biased to prevent appreciable discharge of the capacitor 30 therethrough in the absence of a pulse which is more positive than the charge in the capacitor. The charge across the capacitor provides a forward bias potential for the base-emitter circuit of the transistor 26, and the capacitor 30 will discharge through the base-emitter path.

However, since the input impedance of the emitter follower configuration is very high, for example, approximately one-half megohm, the discharge time for the capacitor 30 is long, relative to the approximately three microsecond spacing between input pulses. Therefore, the capacitor will maintain a charge substantially equal to the potential of the low value input signals. The base-emitter current must be greater than the collector leakage current $I_{co}$ to prevent charging of the capacitor 30 by $I_{co}$. Therefore, transistor 26 is preferably a silicon type junction transistor which displays inherently low $I_{co}$.

When a raster spike is applied to the capacitor 30, it will charge to a value substantially higher than the low level input signals. The time constant of the capacitor discharge path is arranged such that the higher potential charge produced by the raster spike will substantially decay over the 210 microsecond period before the next raster spike is applied; however, it will result in the charge on the capacitor being somewhat higher than the maximum amplitude of the low value signals between raster spikes.

The charge potential across the capacitor 30 appears at the emitter 26e diminished only by a very small voltage drop across the base emitter junction. The input impedance of transistor 28 is very high to prevent rapid discharge of the capacitor 30. Thus the potential applied to the capacitor 30 is applied substantially undiminished in amplitude to the base 28b of the isolating transistor 28. This charge potential is applied substantially undiminished to the emitter 28e; and because the emitters 28e and 25e are directly connected, this potential also appears at the emitter 25e.

As indicated earlier, the output pulses of the driver 17 are applied to the base 25b of the transistor 25. The emitter 25e bias potential is close to the potential across the capacitor 30 diminished only by very small base-emitter junction drops of the transistors 26 and 28. For all practical purposes, therefore, the emitter bias is substantially at the capacitor 30 potential level.

So long as this potential is larger than the input signals applied to the base 25b, the transistor 25 remains cut off. However, when a raster spike is applied to the base of 25b, its potential is substantially more positive than the emitter bias potential, and the transistor 25 will be driven into conduction to produce a negative-going signal C (FIG. 2) at the collector 25c. When the transistor 25 conducts, its emitter 25e is clamped to the base voltage produced by the raster spike. This higher positive potential at the emitter 25e will reverse bias the base-emitter junction of the transistor 28, and transistor 28 cuts off to isolate transistor 26 from the emitter circuit of transistor 25.

Thus it can be seen that depending upon which of the base potentials is most positive, only one of the transistors 25 or 28 will conduct. Since the raster spike is substantially more positive than the level setting voltage amplitude of the capacitor 30, the voltage drop produced across the load resistor 31 will be substantially higher when the transistor 25 is conducting than when the transistor 28 is conducting, thus producing a negative-going swing in response to the raster spikes. Since the leading and trailing edges of the output pulse are determined primarily by the comparison of the instantaneous value of the raster spike with the instantaneous value of the voltage level set by the capacitors 30, the output pulse C will be narrower in width than the input raster signal and will be substantially centered at the maximum peak amplitude of the raster spike for very accurate and precise timing. These output signals are then applied to the output terminal 35 by way of the capacitor 36. Typical values for the components shown in FIG. 1 are set forth in the table below; however, it will be appreciated that these are given by way of example and the invention is not to be limited thereby.

*Resistors*

| | |
|---|---|
| 12—4.99K | 29—5.1K |
| 14—1.33K | 31—432.0 ohms |
| 15—6.65K | 32—93.1 ohms |
| 16—10.7K | 33—1.96K |
| 20—2.4K | 37—8.25K |
| 21—13.0K | 38—1.54K |
| 22—7.5K | |

*Capacitors*

| | |
|---|---|
| 18—1.0 mf. | 36—.33 mf. |
| 30—1.0 mf. | 34—4.7 mf. |

While the invention has been particularly shown and described with reference to a preferred embodiment thereof, it will be understood by those skilled in the art that the foregoing and other changes in form and details may be made therein without departing from the spirit and scope of the invention.

What is claimed is:

1. In an amplitude discriminator for producing an output pulse in response to each significantly higher amplitude increment of a continuous signal characterized by groups of variable amplitude increments of significantly lower amplitude interposed between periodic variable amplitude increments of significantly higher amplitude, the combination comprising, first, second and third transistors each having base, emitter and collector terminals, a unilaterally conductive device connected to the base terminal of the first transistor and adapted to receive the continuous signal, means for operating the first transistor in an emitter follower configuration, a capacitor connected to the unilaterally conductive device and to the base terminal of the first transistor and adapted to be electrically charged through said device, a discharge path for the capacitor including the base and emitter terminals of the first transistor for establishing the capacitor potential at the emitter terminal, the collector terminals of the second and third transistors being directly connected and the emitter terminals of the second and third transistors being directly connected, and an operating circuit for the second and third transistors, the emitter terminal of the first transistor being directly connected to the base terminal of the second transistor to establish the capacitor potential at the emitter terminal of the third transistor when the second transistor is conducting, the base terminal of the third transistor being adapted to receive the continuous signal for turning on the third transistor and turning off the second transistor when the mmoentary value of the continuous signal is greater than the value of the potential established at the emitter terminal of the third transistor.

2. In an amplitude discriminator for producing an output pulse in response to each significantly higher amplitude increment of a continuous signal characterized by groups of variable amplitude increments of significantly lower amplitude interposed between periodic variable amplitude increments of significantly higher amplitude, the combination comprising, a unilaterally conductive device adapted to receive the continuous signal, a capacitor connected to the unilaterally conductive device and adapted to be electrically charged through said device, a high impedance discharge means for the capacitor, a pair of transistors each having base, emitter and collector terminals, the collector terminals being directly connected to each other and the emitter terminals being directly connected to each other, and an operating circuit for the transistors, the base terminal of one of the transistors being connected to the discharge means to establish the capacitor potential at the emitter terminal of the other transistor when the one transistor is conducting, the base terminal of the other transistor being adapted to receive the continuous signal for turning on the other transistor and turning off the one transistor when the momentary value of the continuous signal is greater than the value of the potential established at the emitter terminal of the other transistor.

3. In an amplitude discriminator for producing an output pulse in response to each significantly higher amplitude increment of a continuous signal characterized by groups of variable amplitude increments of significantly lower amplitude interposed between periodic variable amplitude increments of significantly higher amplitude, the combination comprising, a first transistor having base, emitter and collector terminals, a unilaterally conductive device connected to the base terminal and adapted to receive the continuous signal, means for operating the transistor in an emitter follower configuration, a capacitor connected to the unilaterally conductive device and to the base terminal and adapted to be electrically charged through said device, a discharge path for the capacitor including the base and emitter terminals for establishing the capacitor potential at the emitter terminal, a transistor amplifier having base, emitter and collector terminals, an isolating circuit having a high input impedance connected between the emitter terminals to establish the capacitor potential at the emitter terminal of the transistor amplifier, the base terminal of the transistor amplifier being adapted to receive the continuous signal for turning on the amplifier when the momentary value of the continuous signal is greater than the value of the potential established at the emitter terminal of the amplifier.

4. In an amplitude discriminator for producing an output pulse in response to each significantly higher amplitude increment of a continuous signal characterized by groups of variable amplitude increments of significantly lower amplitude interposed between periodic variable amplitude increments of significantly higher amplitude, the combination comprising, first and second transistors each having base, emitter and collector terminals, a unilaterally conductive device connected to the base terminal of the first transistor and adapted to receive the continuous signal, means for operating the first transistor in an emitter follower configuration, a capacitor connected to the unilaterally conductive device and to the base terminal of the first transistor and adapted to be electrically charged through said device, a discharge path for the capacitor including the base and emitter terminals of the first transistor for establishing the capacitor potential at the emitter terminal, the emitter terminal of the first transistor being directly connected to the base terminal of the second transistor to establish the capacitor potential at the emitter terminal of the second transistor when the second transistor is conducting, and a signal translating device having a first control terminal connected to the emitter terminal of the second transistor and a second control terminal adapted to receive the continuous signal for producing an output signal and turning off the second transistor when the momentary value of the continuous signal is greater than the value of the potential established at the emitter terminal of the second transistor.

References Cited in the file of this patent

UNITED STATES PATENTS 2,870,328     Pomeroy _____ Jan. 20, 1959